United States Patent
Kitahara

(10) Patent No.: US 8,656,764 B2
(45) Date of Patent: Feb. 25, 2014

(54) FLOW-RATE MEASURING APPARATUS

(75) Inventor: Noboru Kitahara, Kariya (JP)

(73) Assignee: Denso Corporation, Kariya (JP)

( * ) Notice: Subject to any disclaimer, the term of this patent is extended or adjusted under 35 U.S.C. 154(b) by 7 days.

(21) Appl. No.: 13/472,861

(22) Filed: May 16, 2012

(65) Prior Publication Data

US 2012/0291533 A1 Nov. 22, 2012

(30) Foreign Application Priority Data

May 18, 2011 (JP) .................................. 2011-111572
Mar. 19, 2012 (JP) .................................. 2012-061985

(51) Int. Cl.
*G01M 15/04* (2006.01)

(52) U.S. Cl.
USPC ...................................................... 73/114.32

(58) Field of Classification Search
USPC ................. 73/114.32, 114.34, 202.5, 204.14, 73/204.15
See application file for complete search history.

(56) References Cited

U.S. PATENT DOCUMENTS

| | | | |
|---|---|---|---|
| 4,555,937 A * | 12/1985 | Sumal | 73/114.32 |
| 5,668,313 A | 9/1997 | Hecht et al. | |
| 5,681,989 A | 10/1997 | Kanke et al. | |
| 6,474,177 B2 * | 11/2002 | Maeda et al. | 73/861.63 |
| 6,786,089 B2 * | 9/2004 | Goto et al. | 73/204.21 |
| 6,862,930 B1 * | 3/2005 | Kohno et al. | 73/204.26 |
| 7,177,770 B1 * | 2/2007 | Hocken et al. | 702/45 |
| 7,383,815 B2 * | 6/2008 | Hirayama et al. | 123/399 |
| 7,437,925 B2 * | 10/2008 | Ban et al. | 73/202.5 |
| 2012/0291519 A1 * | 11/2012 | Kitahara | 73/1.16 |

OTHER PUBLICATIONS

Office Action (2 pages) dated Sep. 24, 2013, issued in corresponding Japanese Application No. 2012-061985 and English translation (3 pages).

* cited by examiner

*Primary Examiner* — Freddie Kirkland, III
(74) *Attorney, Agent, or Firm* — Nixon & Vanderhye PC

(57) ABSTRACT

A converting map for an area of a backward air-flow is set based on a relationship between an output and a flow-rate, which are obtained in an air flow in which pulsation including the backward air-flow is generated. The backward air-flow has a dynamic property. The converting map of the present disclosure has a conversion characteristic, which is close to a characteristic in the backward air-flow. Accordingly, it is not necessary to correct the converting map by complicated processes and thereby accuracy of measurement for the area of the backward air-flow is increased.

4 Claims, 9 Drawing Sheets

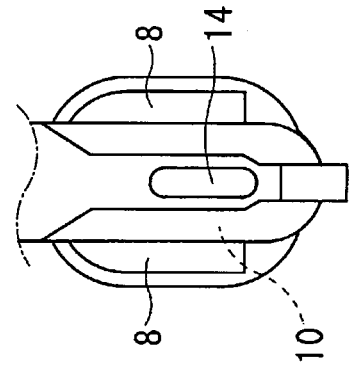
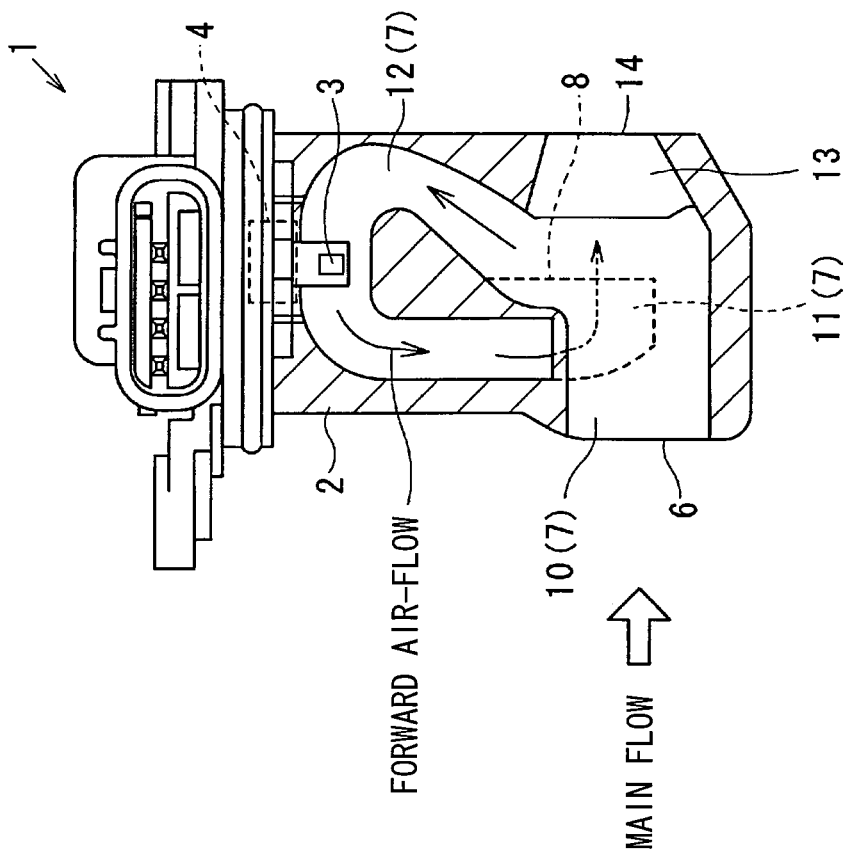

FLOW-RATE MEASURING APPARATUS

CROSS REFERENCE TO RELATED APPLICATION

This application is based on Japanese Patent Applications No. 2011-111572 filed on May 18, 2011 and No. 2012-061985 filed on Mar. 19, 2012, the disclosures of which are incorporated herein by reference.

TECHNICAL FIELD

The present disclosure relates to a flow-rate measuring apparatus, which is arranged in a bypass air passage for abstracting a part of air of a main flow, and which is composed of a flow-rate sensor for outputting an electrical signal depending on a flow-rate of the air and an output transforming device for transforming the output of the flow-rate sensor into a flow-rate by use of a converting characteristic for output-and-flow-rate.

BACKGROUND

The flow-rate sensor outputs the electrical signal depending on the flow-rate of the air and the electrical signal is converted into the flow-rate by the converting characteristic for the output-and-flow-rate (hereinafter referred to as a converting map).

The converting map is memorized in a memory device of an electronic control unit (ECU), which is communicated with the flow-rate sensor. The electrical signal from the flow-rate sensor is converted into the flow-rate by the ECU based on the converting map.

The flow-rate measuring apparatus is applied to, for example, an engine control system for a vehicle, in particular, to an intake air amount measuring apparatus for the engine. The flow-rate measuring apparatus measures a flow-rate of the intake air, which flows in an intake air passage from an upstream side toward a downstream side thereof. The flow of intake air from the upstream to the downstream side is referred to as a forward air-flow, while the flow of the intake air from the downstream to the upstream side is referred to as a backward air-flow. In the flow-rate measuring apparatus, which is capable of measuring the flow-rate of not only the forward air-flow but also the backward air-flow, the converting map is divided into a part for the forward air-flow and a part for the backward air-flow.

A flow-rate measuring apparatus of a prior art, for example, as disclosed in Japanese Patent Publication No. H09-15013 (A), has a converting map (for the forward air-flow and backward air-flow), as shown in FIG. 9, which is prepared based on a relationship between an electrical output of a sensor and a flow-rate, wherein the electrical output is obtained in a static property when the sensor is placed in a static air-flow condition.

However, in an actual measuring situation, the backward air-flow actually generated in a bypass air passage is an instantaneous variation of the air-flow. Accordingly, when the converting map of FIG. 9 (which is prepared on the premise of the static property) is used, a measurement error may occur in an area of the backward air-flow.

According to the flow-rate measuring apparatus of the above prior art, the converting map is corrected when it is used. However, such a process for correcting the converting map is complicated. Therefore, it is desirable to reduce the measurement errors in the area of the backward air-flow without correcting the converting map.

SUMMARY OF THE DISCLOSURE

The present invention is made in view of the above points. It is an object of the present disclosure to provide a flow-rate measuring apparatus, according to which accuracy of measurement is improved in an area of a backward air-flow.

According to a feature of the present disclosure, a flow-rate measuring apparatus has a flow-rate sensor, which will be provided in a bypass air passage for abstracting a part of intake air of a main flow, and which outputs an electrical signal depending on an air flow amount, and an output converting unit for converting an output of the flow-rate sensor to a flow-rate based on an output-and-flow-rate conversion characteristic.

The output-and-flow-rate conversion characteristic for an area of a backward air-flow is set based on a relationship between an output and a flow-rate, which are obtained in an air flow in which pulsation including the backward air-flow is generated, wherein an air-flow from an upstream side to a downstream side in the main flow is defined as a forward air-flow, while an air-flow from the downstream side to the upstream side in the main flow is defined as the backward air-flow.

The backward air-flow, which is generated in the bypass air passage during an operation of the flow-rate measuring apparatus, is instantaneous. Namely, when a pulsation is generated in the main flow of the intake air by an influence of an engine operation, dynamic backward air-flow is generated by the bypass air passage.

According to the present disclosure, the flow-rate measuring apparatus has the converting map having the characteristic close to the condition of the actual use of the flow-rate measuring apparatus, wherein the converting map for the area of the backward air-flow is set based on a dynamic property. In other words, the converting characteristic between the output and the flow-rate is in advance prepared based on the dynamic property.

When the output waveform of the flow-rate sensor is converted to the flow-rate of the intake air based on the above converting characteristic for the area of the backward air-flow, the accuracy for measuring the air flow amount can be increased even in a case of the backward air-flow.

It is not necessary to carry out the complicated calculation for correcting the converting map. It is, therefore, possible to improve the measuring accuracy for the area of the backward air-flow, in a simpler manner.

According to another feature of the present disclosure, a flow-rate waveform, which is measured by a reference sensor having a predetermined response time and which is obtained by measuring behavior of air flow in a condition of the pulsation including the backward air-flow, is defined as a reference flow-rate waveform, a flow-rate waveform, which is obtained by applying a process for a response-delay or a response-advance to the reference flow-rate waveform so that the reference flow-rate waveform is matched to a response time of the flow-rate sensor, is defined as a response-processed reference waveform, and a flow-rate waveform, which is measured by the flow-rate sensor and which is obtained by measuring the behavior of the air flow in the condition of the pulsation including the backward air-flow, is defined as a sensor-output flow-rate waveform.

The output-and-flow-rate conversion characteristic for the area of the backward air-flow is so set that the sensor-output flow-rate waveform is adapted to the response-processed reference waveform.

According to a further feature of the present disclosure, the reference flow-rate waveform is obtained by the reference sensor having a higher response than that of the flow-rate sensor, and the response-processed reference waveform is obtained by applying the process for the response-delay to the reference flow-rate waveform, so that the reference flow-rate waveform is matched to the response time of the flow-rate sensor.

According to a further feature of the present disclosure, a flow-rate waveform, which is measured by a reference sensor having a predetermined response time and which is obtained by measuring behavior of air flow in a condition of the pulsation including the backward air-flow, is defined as a reference flow-rate waveform, a flow-rate waveform, which is measured by the flow-rate sensor and which is obtained by measuring the behavior of the air flow in the condition of the pulsation including the backward air-flow, is defined as a sensor-output flow-rate waveform, and a flow-rate waveform, which is obtained by applying a process for a response-delay or a response-advance to the sensor-output flow-rate waveform so that the sensor-output flow-rate waveform is matched to the response time of the reference sensor, is defined as a response-processed sensor-output waveform.

The output-and-flow-rate conversion characteristic for the area of the backward air-flow is so set that the response-processed sensor-output waveform is adapted to the reference flow-rate waveform.

According to a still further feature of the present disclosure, the reference flow-rate waveform is obtained by the reference sensor having a higher response than that of the flow-rate sensor, and the response-processed sensor-output waveform is obtained by applying the process for the response-advance to the sensor-output flow-rate waveform of the flow-rate sensor, so that the response-processed sensor-output waveform is matched to the predetermined response time of the reference sensor.

BRIEF DESCRIPTION OF THE DRAWINGS

The above and other objects, features and advantages of the present disclosure will become more apparent from the following detailed description made with reference to the accompanying drawings. In the drawings:

FIG. 1A is a schematic cross sectional view showing a flow-rate measuring apparatus according to a first embodiment of the present disclosure;

FIG. 1B is a schematic side view showing the flow-rate measuring apparatus, when viewed from a downstream side thereof;

DETAILED DESCRIPTION OF THE EMBODIMENTS

First Embodiment

Figure 2:
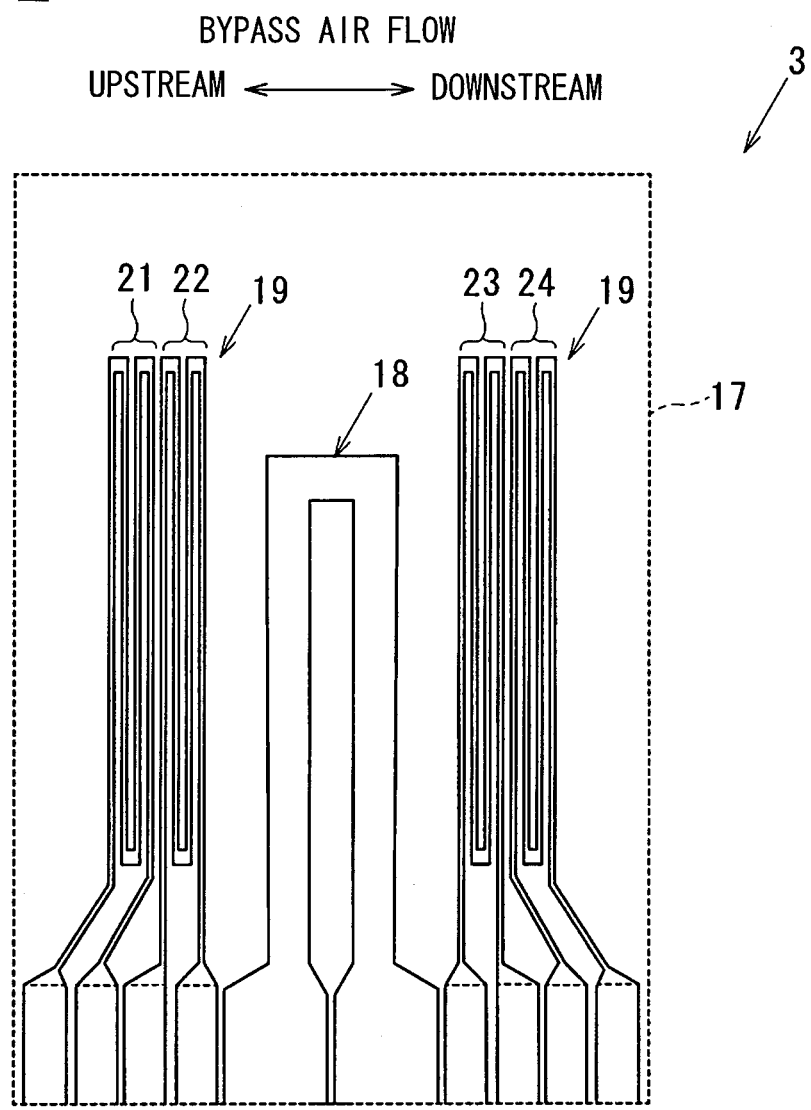
FIG. 2 is a schematic view for explaining a relevant portion of a flow-rate sensor of the first embodiment.

A structure of a flow-rate measuring apparatus 1 of a first embodiment will be explained with reference FIGS. 1A, 1B and 2.

The flow-rate measuring apparatus 1 is, for example, an air-flow meter for measuring an intake air to be supplied to an internal combustion engine of a vehicle. The flow-rate measuring apparatus 1 is provided in an intake-air pipe of the engine.

The flow-rate measuring apparatus 1 is, as explained below, composed of a housing 2, a flow-rate sensor 3, a circuit chip 4, an electronic control unit (ECU; not shown) and so on.

The housing 2 has an inlet port 6, which is opening toward an upstream side of an air flow (a main flow of the intake air flowing through an intake-air pipe) and abstracts a part of the intake air flowing through the intake-air pipe in a forward direction (from an upstream side to a downstream side). The housing 2 has an inner air passage 7, through which the part of the intake air abstracted from the inlet port 6 flows. The flow-rate sensor 3 is accommodated in the inner air passage 7. The housing 2 has outlet ports 8, which are opening toward the downstream side of the intake-air pipe for returning the intake air (which is abstracted from the inlet port 6 and passed by the flow-rate sensor 3) to the intake-air pipe. The flow-rate sensor 3 generates heat-transfer phenomenon between the sensor and the intake air abstracted from the inlet port 6, to thereby output an output corresponding to a mass flow-rate.

In the inner air passage 7, an air flow from the inlet port 6 (an upstream end) to the outlet ports 8 (a downstream end) corresponds to a forward air-flow, while the air flow from the outlet ports 8 to the inlet port 6 corresponds to a backward air-flow.

In other words, when the forward air-flow (from the upstream end to the downstream end) is generated in the main flow of the air, the air flows from the inlet port 6 to the outlet ports 8. On the other hand, when the backward air-flow (from the downstream side to the upstream side) is generated in the main flow of the intake air, the air flows from the outlet ports 8 to the inlet port 6.

The inner air passage 7 is composed of a flow-in passage 10 continuing from the inlet port 6 in a downstream direction, a flow-out passage 11 continuing from the outlet ports 8 in an upstream direction, and a go-around passage 12 for connecting the flow-in passage 10 and the flow-out passage 11 with each other. The flow-rate sensor 3 is provided in the go-around passage 12.

The flow-in passage 10 is so formed that the flow-in passage 10 straightly extends from the inlet port 6 in the downstream direction, so that the air flow in the flow-in passage 10 is in parallel to the forward air-flow in the main flow. A dust-discharge passage 13 is connected to a downstream end of the flow-in passage 10, in order that any dust contained in the intake air abstracted from the inlet port 6 goes straight ahead and thereby the dust is discharged from the inner air passage 7. A downstream end of the dust-discharge passage 13 forms a dust-discharge port 14, wherein a passage area of the dust-discharge passage 13 is gradually decreased toward the dust-discharge port 14.

The go-around passage 12 is formed in a C-shape for connecting the flow-in passage 10 to the flow-out passage 11, so that the intake air abstracted from the inlet port 6 goes around from the flow-in passage 10 toward the flow-out passage 11. The flow-rate sensor 3 is provided in the go-around passage 12 at such a position, at which the intake air flows in a reversed direction opposite to a flow direction of the air in the flow-in passage 10.

In other words, the go-around passage 12 forms a bypass air passage, in which the part of the intake air of the main flow is abstracted, and a flow-rate of the intake air is detected by the flow-rate sensor 3 located in the go-around passage 12.

The go-around passage 12 is bifurcated at the downstream end of the flow-in passage 10 in such a way that the go-around passage 12 is bent by almost 90 degrees from the straight air passage formed between the inlet port 6 and the dust-discharge passage 13. In other words, the flow-in passage 10 is bifurcated at the downstream end thereof into the go-around passage 12 and the dust-discharge passage 13. The dust goes straight ahead by its inertia force from the flow-in passage 10 to the dust-discharge passage 13 and then the dust is discharged from the dust-discharge port 14 into the intake-air pipe. A portion of the intake air changes its flow direction from the flow-in passage 10 to the go-around passage 12 and flows through the go-around passage 12 (also referred to as a bypass air passage).

The flow-out passage 11 is connected to a downstream end of the go-around passage 12 and bent by almost 90 degrees from the air passage formed at the downstream end of the go-around passage 12. The outlet ports 8 are formed at downstream ends of the flow-out passage 11, as shown in FIGS. 1A and 1B.

A downstream portion of the flow-out passage 11 is divided into two passage portions, which stride across the flow-in passage 10. The outlet ports 8 are formed at both sides of the flow-in passage 10. Each of the outlet ports 8 is opening in a direction to the downstream side of the main flow of the intake air.

The flow-rate sensor 3 outputs the electrical signal (for example, a voltage signal) depending on the flow-rate of the intake air flowing through the go-around passage 12.

As shown in FIG. 2, the flow-rate sensor 3 is composed of a membrane 17 formed in a semi-conductor substrate, a heater element 18 made of a thin-film resistive element, and a thermo sensor 19. The heater element 18 and the thermo sensor 19 are formed on the membrane 17 and connected to a circuit board (not shown) provided in the circuit chip 4.

The thermo sensor 19 has temperature measuring resistive elements 21 and 22 provided at an upstream side of the heater element 18 and temperature measuring resistive elements 23 and 24 provided at a downstream side of the heater element 18. The heater element 18 as well as the thermo sensor 19 is electrically connected to the circuit board of the circuit chip 4. The electrical signal, which depends on a temperature difference between the temperature measuring resistive elements 21 & 22 and 23 & 24, is outputted from the circuit chip 4 via an output circuit and an amplifying circuit provided on the circuit board.

The circuit chip 4 is composed of a heater-element control circuit for controlling temperature of the heater element 18 at a predetermined temperature, the output circuit for outputting voltage depending on the flow-rate of the intake air, and the amplifying circuit for amplifying the output voltage. The amplifying circuit has a writable memory device, in which an amount of a gain and an amount of offset are written.

The ECU is the electronic control unit which is communicated with the flow-rate sensor 3. The ECU is composed of a memory device, which memorizes the converting map (the conversion characteristic for output-and-flow-rate) for converting the output (the electrical signal) of the flow-rate sensor 3 into the flow-rate (a physical quantity), and an operational circuit for converting the output of the flow-rate sensor 3 into the flow-rate by use of the converting map. The ECU corresponds to an output converting unit.

Characteristic features of the present embodiment will be further explained with reference to FIGS. 3 to 7.

The converting map for the area of the backward air-flow is set based on a relationship between an output during a period, in which a pulsation (including the backward air-flow) is generated, and a flow-rate.

A method for preparing the converting map for the area of the backward air-flow will be explained.

Figure 3:
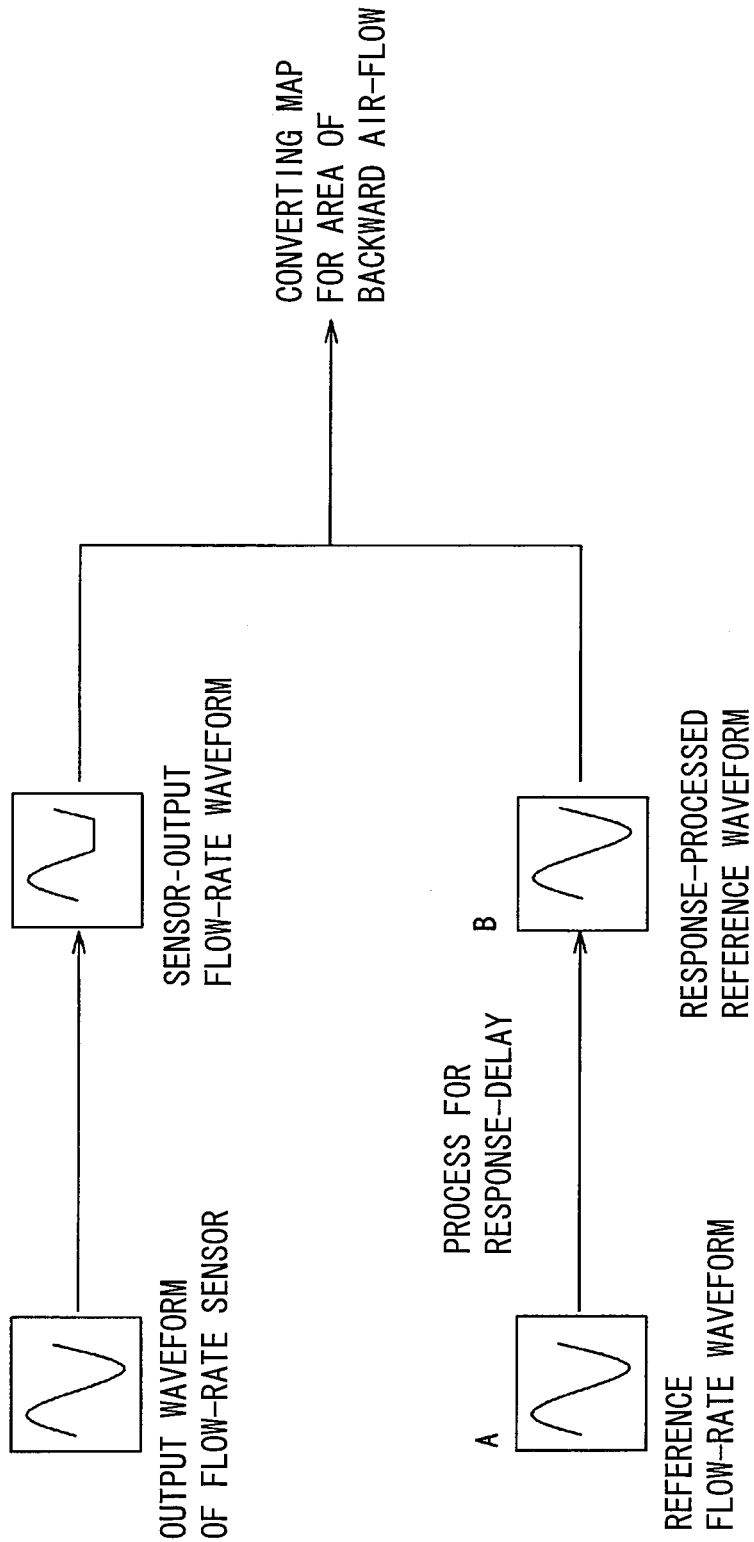
FIG. 3 is a view for explaining a flow of preparing a converting map for an area of the backward air-flow.
Figure 5A:
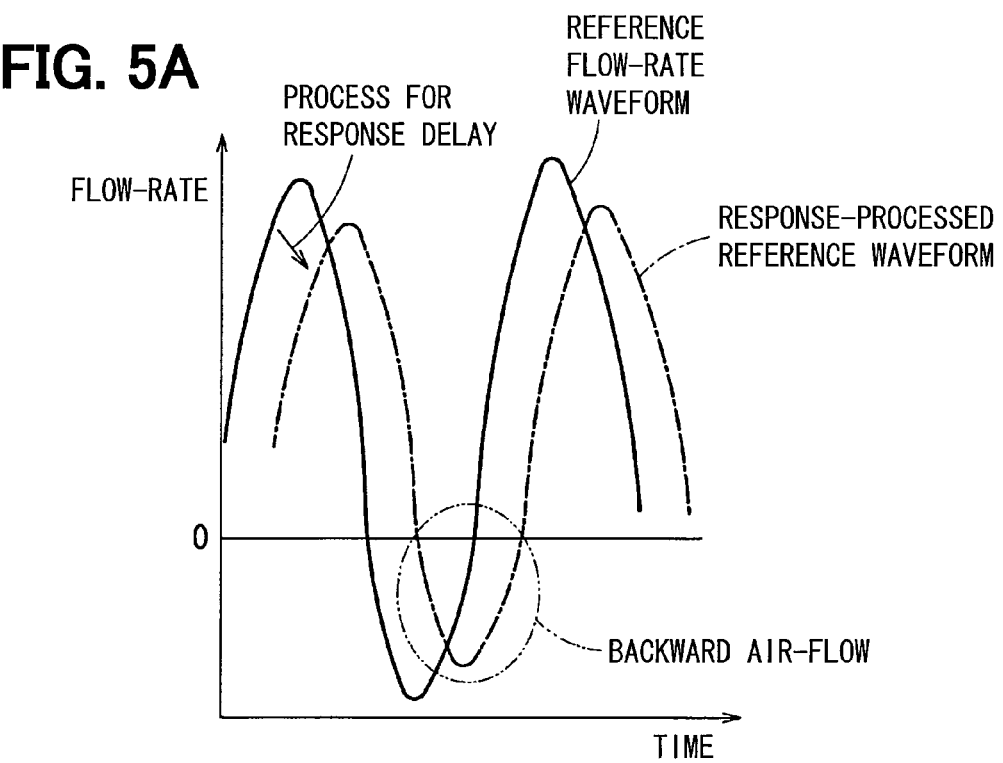
FIG. 5A is a view showing a reference flow-rate waveform and a response-processed reference waveform.
Figure 5B:
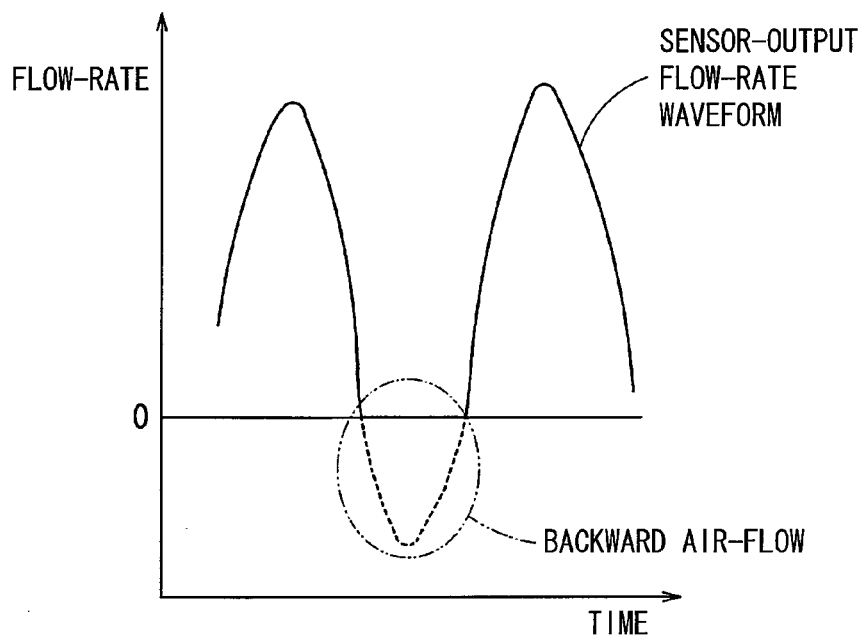
FIG. 5B is a view showing a flow-rate waveform based on an output from the flow-rate sensor.

As shown in FIG. 3 (indicated by a step A), a high-responsive sensor (that is, a reference sensor), which has a predetermined response time, more exactly, a higher responsiveness than the flow-rate measuring apparatus 1, is provided in an air flow in which the pulsation (including the backward air-flow) is generated, in order to measure behavior of the air flow. A flow-rate waveform is obtained from the high-responsive sensor at the step A of FIG. 3, as indicated by a solid line in FIG. 5A. The flow-rate waveform of the solid line in FIG. 5A is referred to as a reference flow-rate waveform.

The flow-rate measuring apparatus 1 is likewise arranged in an air flow, a condition of which is identical to the condition of the air flow for the high-responsive sensor. An output (an output waveform) is obtained from the flow-rate sensor 3 of the flow-rate measuring apparatus 1 at a step I in FIG. 3. The output of the flow-rate sensor 3 is then converted into a flow-rate (a flow-rate waveform) based on a temporary converting map, such as a map shown in FIG. 4 (a solid line) in which the converting map is set only for the area of the forward air-flow. A flow-rate waveform (shown in FIG. 5B) based on the output from the flow-rate sensor 3 is obtained at a step II in FIG. 3. The flow-rate waveform (FIG. 5B) is also referred to as a sensor-output flow-rate waveform.

Figure 4:
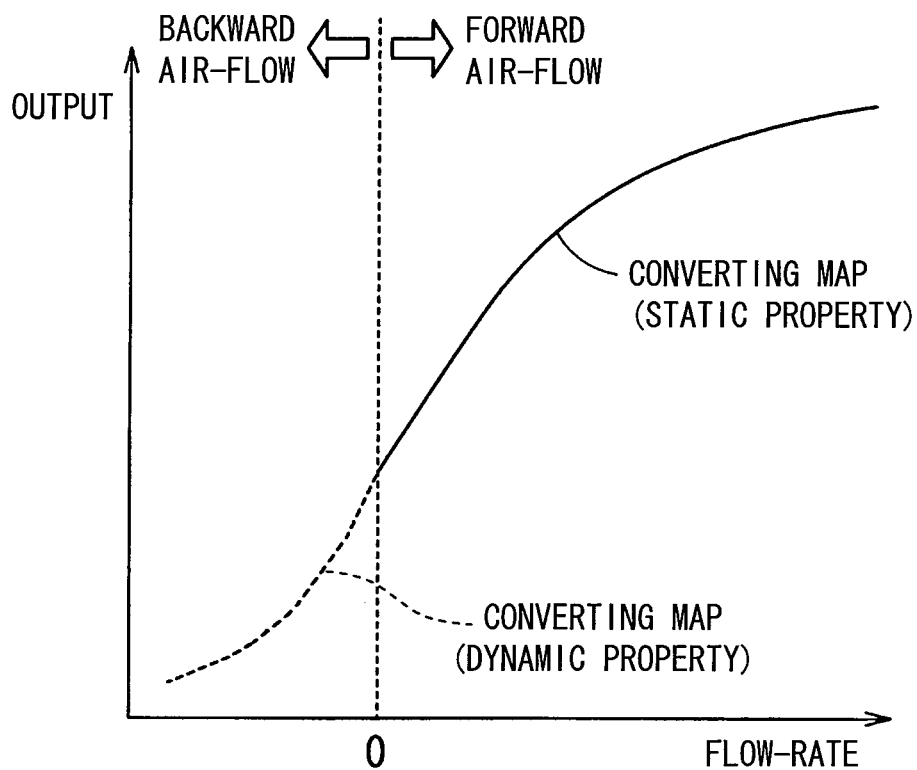
FIG. 4 is a graph showing a converting characteristic for output-and-flow-rate.

The converting map of FIG. 4 for the area of the forward air-flow is set based on the static property. In other words, the converting map for the area of the forward air-flow is made based on the relationship between the output and the flow-rate in a static air flow condition.

Figure 6:
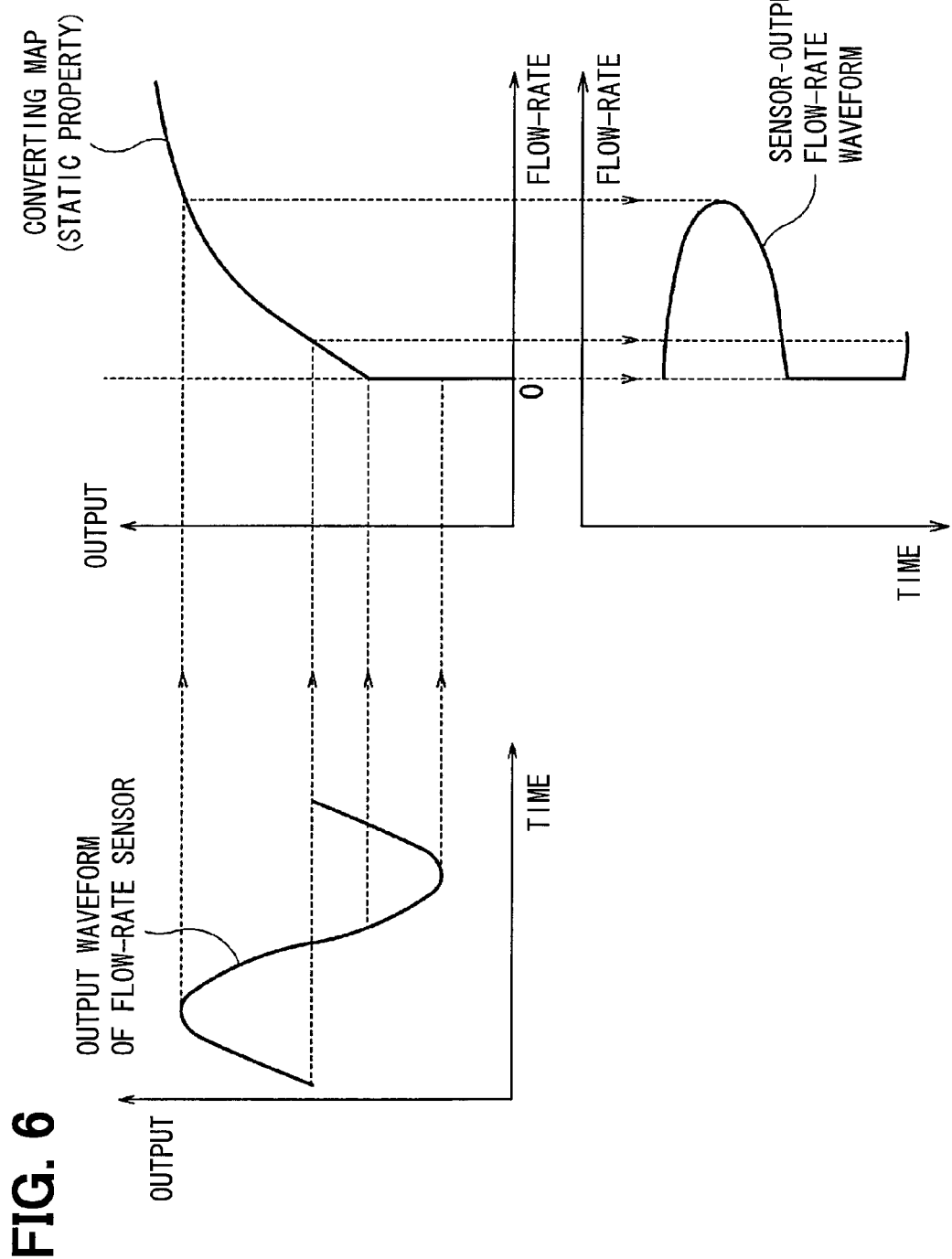
FIG. 6 is a view for showing a converting process from an output waveform of the flow-rate sensor to a flow-rate waveform of the flow-rate sensor (a sensor-output flow-rate waveform)

FIG. 6 is a view for further showing the converting process from the step I to the step II in FIG. 3. The temporary converting map used in the process from the step I to the step II in FIG. 3 has the converting map only for the area of the forward air-flow. Therefore, according to the temporary converting map, an output of the conversion is zero in the area of the backward air-flow.

In the converting process from the step A to the step B in FIG. 3, on the other hand, a process for a response delay is carried out for the reference flow-rate waveform of the step A, so that a delay corresponding to a delay of the flow-rate sensor 3 is applied to the reference flow-rate waveform. As a result, at the step B in FIG. 3, a flow-rate waveform with the response delay indicated by a one-dot-chain line in FIG. 5A is obtained. The process for the response delay means a process for a primary delay having a predetermined time constant. The flow-rate waveform (with the response delay) indicated by the one-dot-chain line in FIG. 5A is also referred to as a response-processed reference waveform.

A waveform portion of the response-processed reference waveform (that is, a portion of the one-dot-chain line for the area of the backward air-flow in FIG. 5A) is adapted to the sensor-output flow-rate waveform (that is, the flow-rate waveform based on the sensor output) for the area of the backward air-flow. Accordingly, the converting map for the area of the backward air-flow is prepared (as indicated by a dotted line in FIG. 4).

Figure 7:
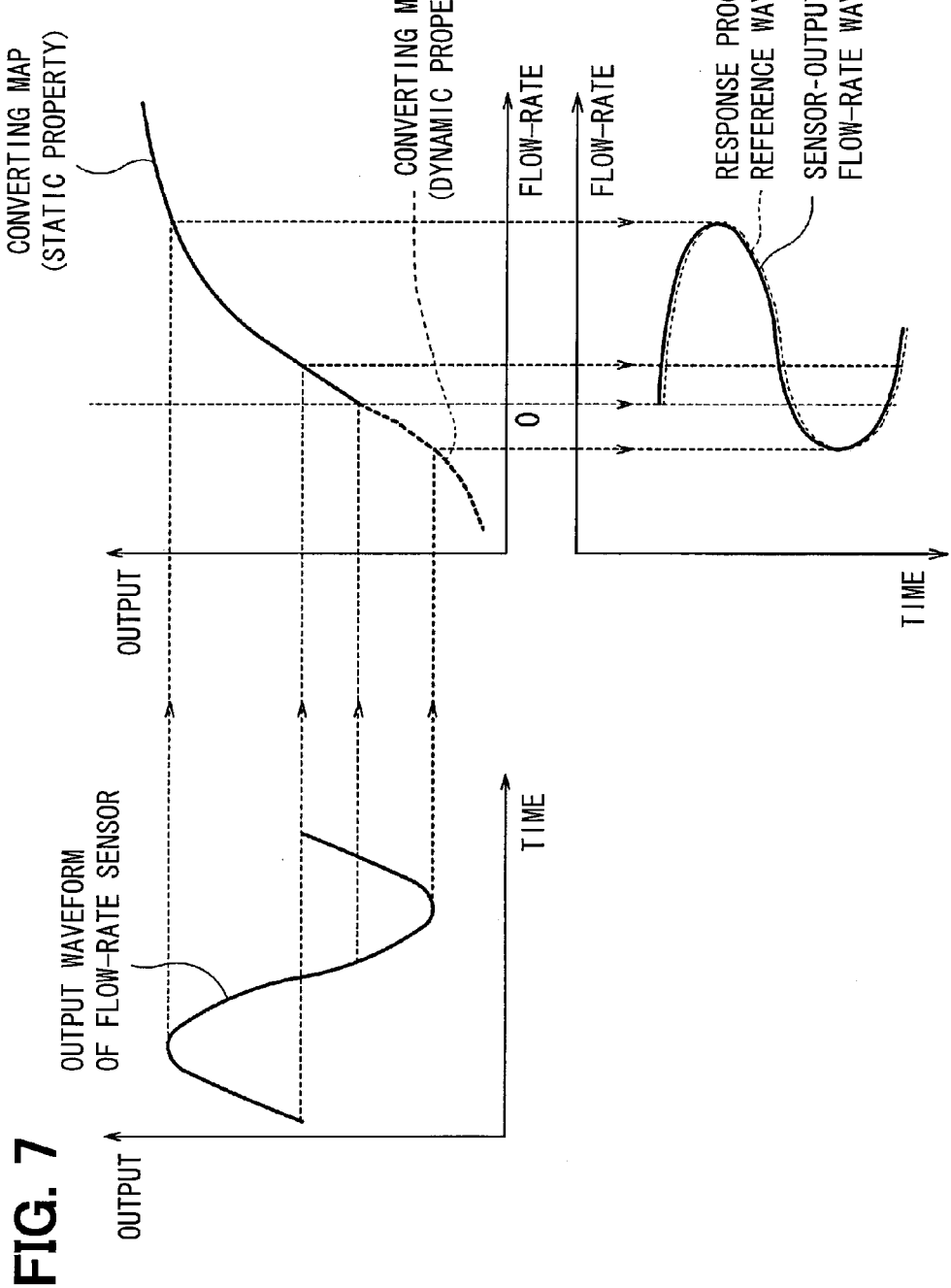
FIG. 7 is a further view for showing a converting process from an output waveform of the flow-rate sensor to the flow-rate waveform of the flow-rate sensor.

In other words, as shown in FIG. 7, the converting map for the area of the backward air-flow is made in the following manner. A portion of the flow-rate waveform which is converted from the output waveform of the flow-rate sensor 3 based on the converting map, that is, a portion of the sensor-output waveform for the area of the backward air-flow (shown in FIG. 5B), is adapted to a waveform shape for the backward air-flow of the response-processed reference waveform.

As above, according to the present embodiment, the converting map for the area of the backward air-flow is set based on the relationship between the output, which is outputted when the pulsation (including the backward air-flow) is generated, and the flow-rate.

The backward air-flow, which is generated in the go-around passage 12 during the operation of the flow-rate measuring apparatus 1, is instantaneous. Namely, when the pulsation is generated in the main flow of the intake air by an influence of the engine operation, the dynamic backward air-flow is generated by the pulsation in the go-around passage 12.

According to the present embodiment, the flow-rate measuring apparatus 1 has the converting map having the characteristic close to the condition of the actual use of the flow-rate measuring apparatus 1. The converting map for the area of the backward air-flow is set based on the dynamic property. In other words, the converting characteristic between the output and the flow-rate is in advance prepared based on the dynamic property.

When the output waveform of the flow-rate sensor is converted to the flow-rate of the intake air based on the above converting characteristic for the area of the backward air-flow, the accuracy for measuring the air flow amount can be increased even in a case of the backward air-flow.

It is not necessary to carry out the complicated calculation for correcting the converting map. It is, therefore, possible to improve the measuring accuracy for the area of the backward air-flow, in a simpler manner.

Second Embodiment

Figure 8A:
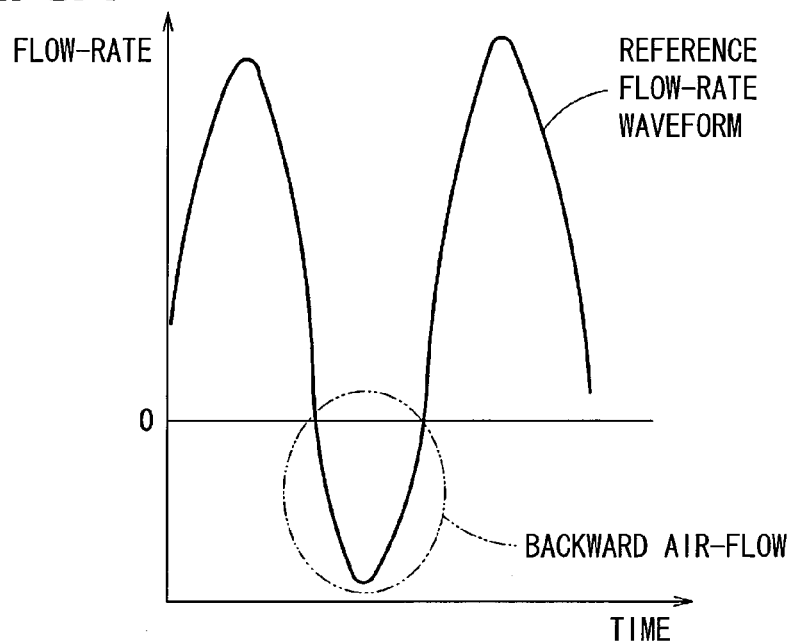
FIG. 8A is a view showing a reference flow-rate waveform according to a second embodiment of the present disclosure.
Figure 8B:
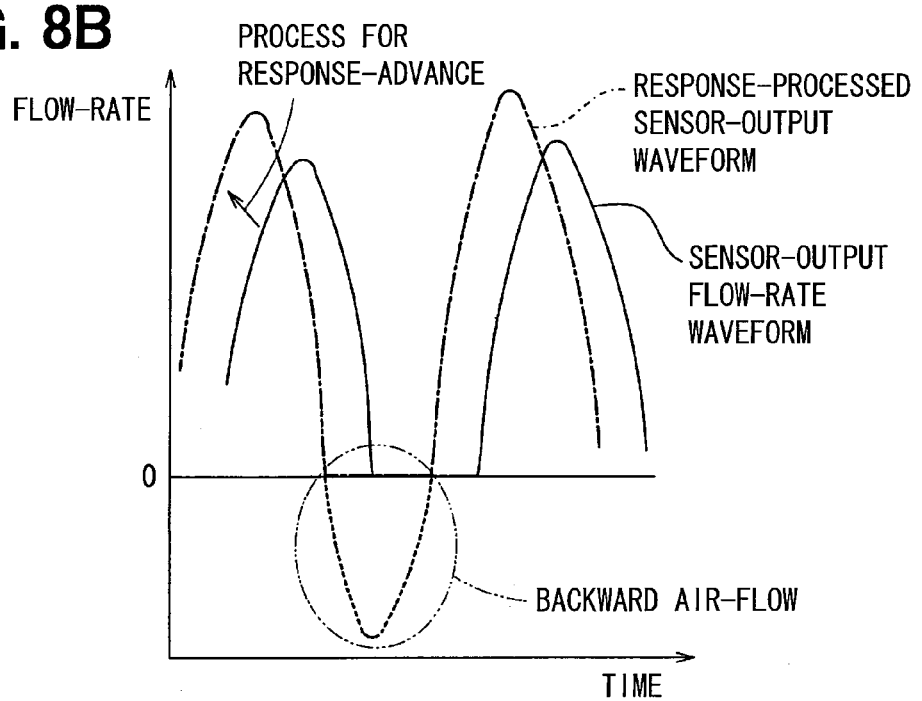
FIG. 8B is a view showing a sensor-output flow-rate waveform of the flow-rate sensor and a response-processed sensor-output waveform.
Figure 9:
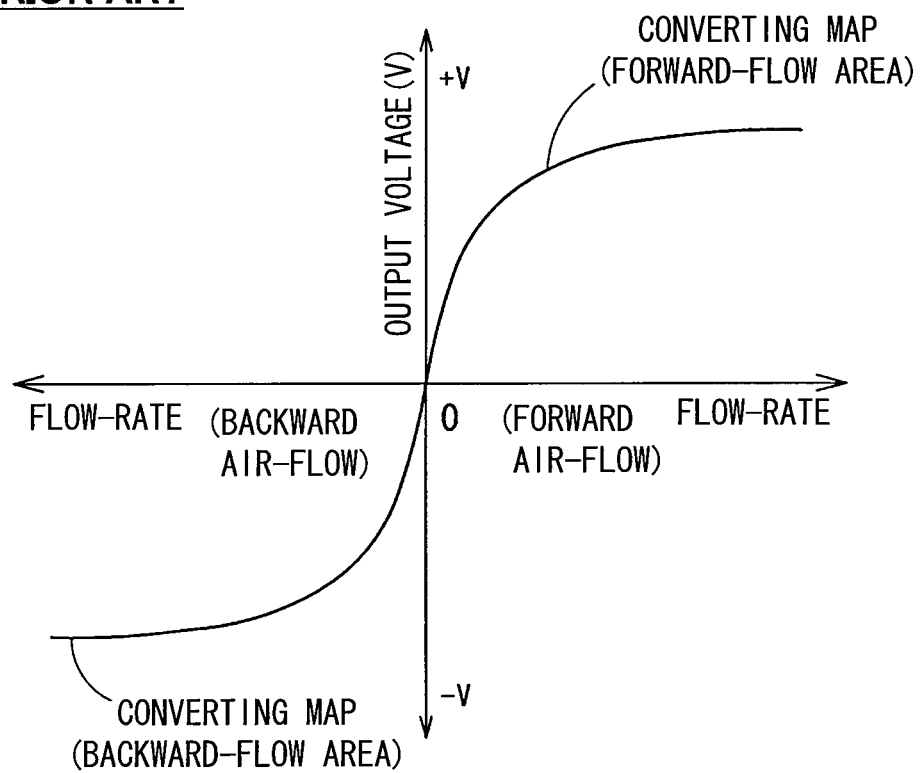
FIG. 9 is a graph showing a converting characteristic for output-and-flow-rate of a prior art.

A second embodiment of the present disclosure will be explained with reference to FIGS. 4, 8A and 8B.

In the present embodiment, the converting map is also set based on the relationship between the output of the flow-rate sensor during the operation with the pulsation (including the backward air-flow) and the flow-rate of the intake air.

A method for preparing the converting map of the present embodiment for the area of the backward air-flow will be explained.

At first, a high-responsive sensor (that is, a reference sensor), which has a predetermined response time, more exactly, a higher responsiveness than the flow-rate measuring apparatus 1, is provided in an air flow in which the pulsation (including the backward air-flow) is generated. A flow-rate waveform is obtained from the high-responsive sensor, as indicated by a solid line in FIG. 8A. The flow-rate waveform of the solid line in FIG. 8A is referred to as a reference flow-rate waveform.

Then, the flow-rate measuring apparatus 1 is likewise arranged in an air flow (having the pulsation), a condition of which is identical to the condition of the air flow for the high-responsive sensor. A flow-rate waveform is obtained based on the output from the flow-rate sensor 3 of the flow-rate measuring apparatus 1, as shown in FIG. 8B (indicated by a solid line). The flow-rate waveform (the solid line in FIG. 8B) is also referred to as a sensor-output flow-rate waveform.

A process for a response-advance is applied to the flow-rate waveform based on the output from the flow-rate sensor 3 (the sensor-output flow-rate waveform). In other words, the flow-rate waveform based on the output from the flow-rate sensor 3 (the sensor-output flow-rate waveform) is advanced by such a time, which corresponds to a time difference between the reference flow-rate waveform based on the high-responsive sensor and the flow-rate waveform based on the output from the flow-rate sensor 3. As a result, a flow-rate waveform with a response-advance is obtained, as indicated by a one-dot-chain line in FIG. 8B. The flow-rate waveform (the one-dot-chain line in FIG. 8B) is also referred to as a response-processed sensor-output waveform. Then, a portion of the reference flow-rate waveform for the area of the backward air-flow (indicated in FIG. 8A) is adapted to the flow-rate waveform with the response-advance (the response-processed sensor-output waveform indicated by the one-dot-chain line in FIG. 8B), so that a portion of the flow-rate waveform for the area of the backward air-flow is obtained as indicated by a dotted line in FIG. 8B (the dotted line in FIG. 8B also corresponds to the dotted line in FIG. 4).

As above, the converting map for the area of the backward air-flow is also obtained in the present embodiment, based on the relationship between the output and the flow-rate, wherein the output is generated in the condition when the pulsation (including the backward air-flow) is generated. Accordingly, the same advantages to the first embodiment can be obtained in the present embodiment.

(Modifications)

In the above embodiments, the bypass air passage is formed, according to which the part of the intake air of the main flow is abstracted by the go-around passage 12. The structure of the bypass air passage should not be limited to that of the above embodiments. For example, a bypass air passage disclosed in FIG. 7 of Japanese Patent Publication No. H09-15013 (A) may be used, according to which a forward air-flow in the bypass air passage is in the same direction to a forward air-flow of a main flow.

In the above embodiments, the ECU has the converting map. However, the converting map may be formed in the circuit chip 4 of the flow-rate measuring apparatus 1 and detected signals may be sent to the ECU.

In the above embodiments, the high-responsive sensor (the reference sensor) is provided in the air flow so as to detect the behavior of the air flow including the pulsation. However, such a sensor having a larger response delay than the flow-rate sensor 3 may be used. In such a case, a process for response-advance is applied to the reference flow-rate waveform for the first embodiment to thereby obtain a flow-rate waveform with a response-advance (the response-processed reference waveform), while a process for response-delay is applied to the flow-rate waveform based on the output from the flow-rate sensor 3 for the second embodiment to thereby obtain a flow-rate waveform with a response-delay (the response-processed sensor-output waveform).

In addition, such a sensor having a response almost the same to that of the flow-rate sensor 3 may be used instead of the high-responsive sensor.

In the above embodiment, the output from the flow-rate sensor 3 is converted to the flow-rate based on the temporary converting map (which has the converting map only for the area of the forward air-flow) so as to obtain the sensor-output flow-rate waveform. The temporary converting map should not be limited to the above converting map. For example, the converting map may have a predetermined mathematical function between the output and the flow-rate for the area of the backward air-flow. In such a case, a portion of the sensor-output flow-rate waveform for the area of the backward air-flow based on the output from the flow-rate sensor 3 is such a waveform, which corresponds to the predetermined mathematical function between the output and the flow-rate. Then, the converting map for the area of the backward air-flow is redefined so that the portion of the sensor-output flow-rate waveform for the backward air-flow will be approximated to the reference flow-rate waveform.

What is claimed is:

1. A flow-rate measuring apparatus comprising:
a flow-rate sensor, which is provided in a bypass air passage for abstracting a part of intake air of a main flow, and which outputs an electrical signal depending on an air flow amount; and
an output converting unit for converting an output of the flow-rate sensor to a flow-rate based on an output-and-flow-rate conversion characteristic, wherein:
the output-and-flow-rate conversion characteristic for an area of a backward air-flow is set based on a relationship between an output and a flow-rate, which are obtained in an air flow in which pulsation including the backward air-flow is generated,
an air-flow from an upstream side to a downstream side in the main flow is defined as a forward air-flow, while an air-flow from the downstream side to the upstream side in the main flow is defined as the backward air-flow,
a flow-rate waveform, which is measured by a reference sensor having a predetermined response time and which is obtained by measuring behavior of air flow in a condition of the pulsation including the backward air-flow, is defined as a reference flow-rate waveform,
a flow-rate waveform, which is obtained by applying a process for a response-delay or a response-advance to the reference flow-rate waveform so that the reference flow-rate waveform is matched to a response time of the flow-rate sensor, is defined as a response-processed reference waveform,
a flow-rate waveform, which is measured by the flow-rate sensor and which is obtained by measuring the behavior of the air flow in the condition of the pulsation including the backward air-flow, is defined as a sensor-output flow-rate waveform, and
the output-and-flow-rate conversion characteristic for the area of the backward air-flow is so set that the sensor-output flow-rate waveform is adapted to the response-processed reference waveform.

2. The flow-rate measuring apparatus according to claim 1, wherein
the reference flow-rate waveform is obtained by the reference sensor having a higher response than that of the flow-rate sensor, and
the response-processed reference waveform is obtained by applying the process for the response-delay to the reference flow-rate waveform, so that the reference flow-rate waveform is matched to the response time of the flow-rate sensor.

3. A flow-rate measuring apparatus comprising:
a flow-rate sensor, which is provided in a bypass air passage for abstracting a part of intake air of a main flow, and which outputs an electrical signal depending on an air flow amount; and
an output converting unit for converting an output of the flow-rate sensor to a flow-rate based on an output-and-flow-rate conversion characteristic, wherein:
the output-and-flow-rate conversion characteristic for an area of a backward air-flow is set based on a relationship between an output and a flow-rate, which are obtained in an air flow in which pulsation including the backward air-flow is generated,
an air-flow from an upstream side to a downstream side in the main flow is defined as a forward air-flow, while an air-flow from the downstream side to the upstream side in the main flow is defined as the backward air-flow,
a flow-rate waveform, which is measured by a reference sensor having a predetermined response time and which is obtained by measuring behavior of air flow in a condition of the pulsation including the backward air-flow, is defined as a reference flow-rate waveform,
a flow-rate waveform, which is measured by the flow-rate sensor and which is obtained by measuring the behavior of the air flow in the condition of the pulsation including the backward air-flow, is defined as a sensor-output flow-rate waveform,
a flow-rate waveform, which is obtained by applying a process for a response-delay or a response-advance to the sensor-output flow-rate waveform so that the sensor-output flow-rate waveform is matched to the response time of the reference sensor, is defined as a response-processed sensor-output waveform, and
the output-and-flow-rate conversion characteristic for the area of the backward air-flow is so set that the response-processed sensor-output waveform is adapted to the reference flow-rate waveform.

4. The flow-rate measuring apparatus according to claim 3, wherein
the reference flow-rate waveform is obtained by the reference sensor having a higher response than that of the flow-rate sensor, and
the response-processed sensor-output waveform is obtained by applying the process for the response-advance to the sensor-output flow-rate waveform of the flow-rate sensor, so that the response-processed sensor-output waveform is matched to the predetermined response time of the reference sensor.

\* \* \* \* \*